US006846425B2

(12) United States Patent
Wong

(10) Patent No.: US 6,846,425 B2
(45) Date of Patent: Jan. 25, 2005

(54) METAL ALLOY 42 LIQUID LEVEL CONTROL/APERTURE PLATE FOR ACOUSTIC INK PRINTING PRINTHEAD

(75) Inventor: Kaiser H. Wong, Torrance, CA (US)

(73) Assignee: Xerox Corporation, Stamford, CT (US)

(*) Notice: Subject to any disclaimer, the term of this patent is extended or adjusted under 35 U.S.C. 154(b) by 222 days.

(21) Appl. No.: 10/260,509

(22) Filed: Sep. 27, 2002

(65) Prior Publication Data

US 2004/0060901 A1 Apr. 1, 2004

(51) Int. Cl.[7] ......................... G01D 15/00; G11B 5/127

(52) U.S. Cl. ......................... 216/27

(58) Field of Search ......................... 216/27, 2; 347/46, 347/20, 29, 40, 44, 47, 54, 63, 64, 65, 67, 71

(56) References Cited

U.S. PATENT DOCUMENTS

| | | | | |
|---|---|---|---|---|
| 6,199,970 B1 | * | 3/2001 | Roy et al. | 347/46 |
| 6,416,678 B1 | | 7/2002 | Hadimioglu et al. | 216/26 |
| 6,488,357 B2 | * | 12/2002 | Skinner et al. | 347/47 |
| 6,491,375 B1 | * | 12/2002 | Fitch | 347/46 |

* cited by examiner

*Primary Examiner*—Gregory Mills
*Assistant Examiner*—Roberts Culbert
(74) *Attorney, Agent, or Firm*—Oliff & Berridge, PLC

(57) ABSTRACT

An acoustic ink printing print head utilizing metal alloy 42 is disclosed. Additionally, a process for incorporating the metal alloy 42 (alloy with approximately 42% nickel and 58% iron) to build the liquid level control/aperture plate defining an AIP print head is disclosed. The process consists of fabricating a channel plate and an aperture plate from the metal alloy 42 and bonding the two structures together thereby defining the liquid level control/aperture plate.

13 Claims, 6 Drawing Sheets

FIG. 2
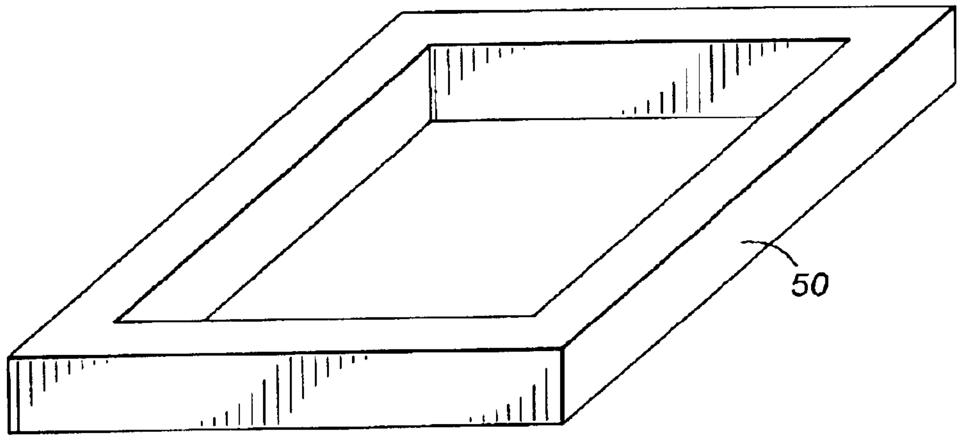
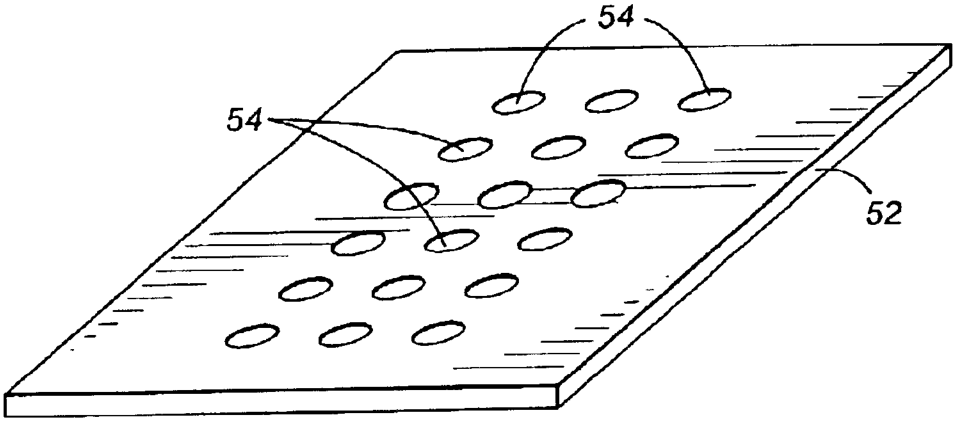
FIG. 3

FIG. 4
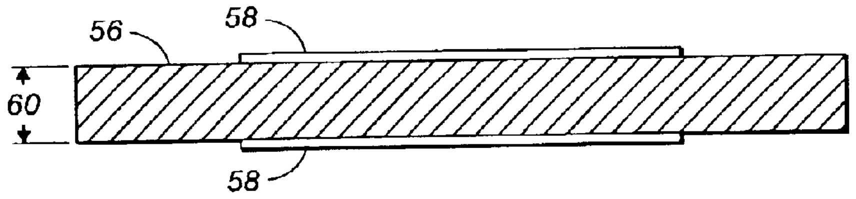
FIG. 5
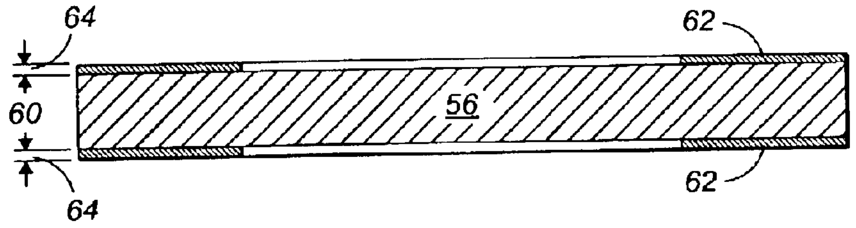
FIG. 6
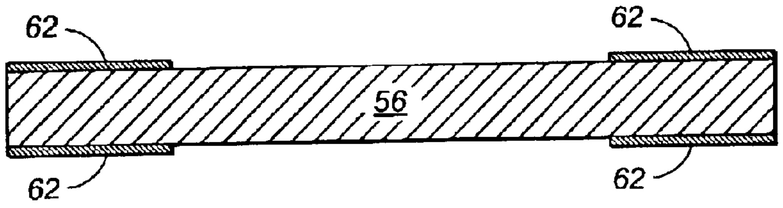
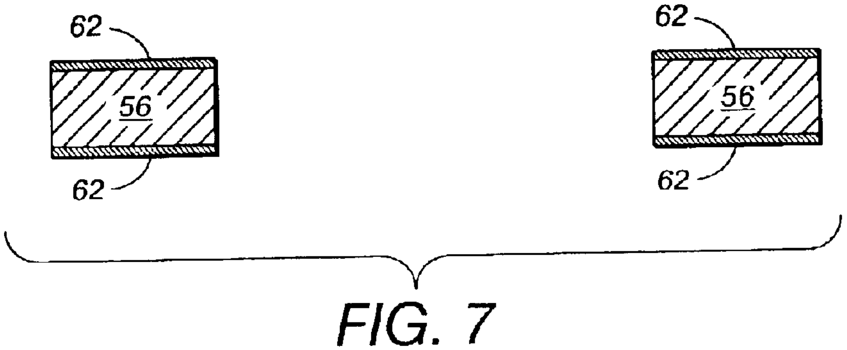
FIG. 7

FIG. 8
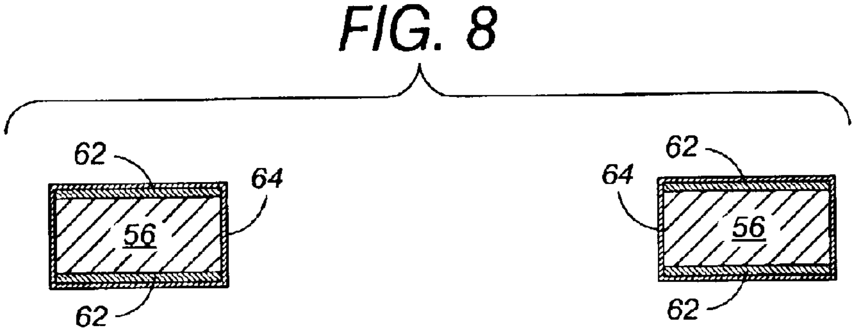
FIG. 9
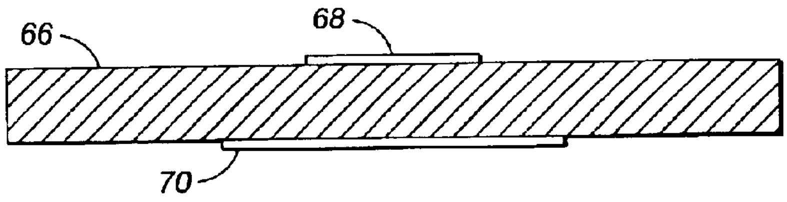
FIG. 10
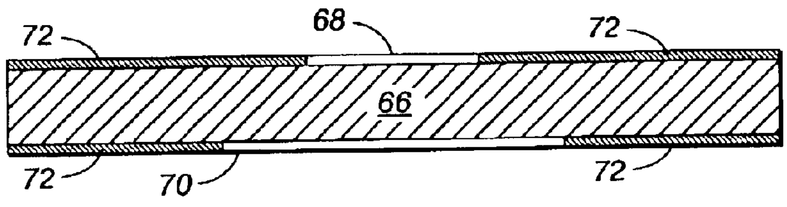
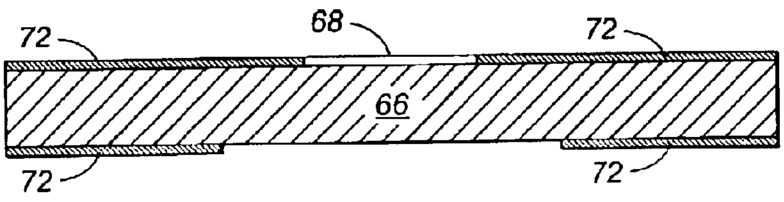
FIG. 11

METAL ALLOY 42 LIQUID LEVEL CONTROL/APERTURE PLATE FOR ACOUSTIC INK PRINTING PRINTHEAD

BACKGROUND

This invention relates to acoustic ink printing and, more particularly, to acoustic ink printing with hot melt inks. Acoustic ink printing is a promising direct marking technology because it does not require the nozzles of the small ejection orifices which have been a major cause of the reliability and pixel placement accuracy problems that conventional drop on demand and continuous stream ink jet printers have experienced.

As shown, FIG. 1 provides a view of a prior art acoustic ink printing element 10. As shown, the element 10 includes a glass layer 12 having an electrode layer 14 disposed thereon. A piezoelectric layer 16, preferably formed of zinc oxide, is positioned on the electrode layer 14 and an electrode 18 is disposed on the piezoelectric layer 16. Electrode layer 14 and electrode 18 are connected through a surface wiring pattern representatively shown at 20 and cables 22 to a radio frequency (RF) power source 24 which generates power that is transferred to the electrodes 14 and 18. On a side opposite the electrode layer 14, a lens 26, preferably a concentric Fresnel lens, is formed. Spaced from the lens 26 is a liquid level control plate 28, having an aperture 30 formed therein. Ink 32 is retained between the liquid level control plate 28, having an aperture 30 formed therein. Ink 32 is retained between the liquid level control plate 28 and the glass layer 12, and the aperture 30 is aligned with the lens 26 to facilitate emission of a droplet 34 of ink from the aperture 30.

The lens 26, the electrode layer 11 the piezoelectric layer 16, and the electrode 18 are formed on the glass layer 12 through known photolithographic techniques. The liquid level control plate 28 is subsequently positioned to be spaced from the glass layer 12. The ink 32 is fed into the space between the plate 28 and the glass layer 12 from an ink supply (not shown). The liquid level control/aperture structure 10 used in prior art was a piece of silicon 25 etched to form a thick wall enclosure in the outside and a much thinner aperture area in the inside as depicted in FIG. 1. Although this silicon liquid level control/aperture structure can be etched precisely, it is not practical to use it either in prototype, pilot or manufacturing scales due, to its high cost and fragility. When the requirement for the outside wall thickness is 356 $\mu$m, which is already thinner than the normal, silicon wafer of 500 $\mu$m the requirement for the inside aperture area is only 100 $\mu$m which is so vulnerable to breakage.

In addition to the cost issue and fragility problem, there is a thermal expansion mismatch between the silicon and the glass which is the substrate used to fabricate acoustic transducer, frensel lens and circuitry. The thermal expansion coefficient of silicon is 2.6 ppm/C while that of the glass (7059) is 4.6 ppm/C. The silicon liquid level control/aperture plate needs to be bonded 42 to the glass substrate 12 at elevated temperature which is required to cure the adhesive (Epon) during bonding. Warpage of the printhead structure is observed even for a 2 inch print head due to the thermal mismatch. The warpage will be tremendous when this structure is used for full width page printing. Therefore, what is needed is a structure for an AIP print head that solves the above-identified problems.

SUMMARY

An acoustic ink printing print head utilizing metal alloy 42 is disclosed. Additionally, a process for incorporating the metal alloy 42 (alloy with approximately 42% nickel and 58% iron) to build the liquid level control/aperture plate defining an AIP print head is disclosed. The process consists of fabricating a channel plate and an aperture plate from the metal alloy 42 and bonding the two structures together thereby defining the liquid level control/aperture plate. This new AIP print head is robust and able to operate with a high degree of reliability, is economical to make, and is manufactured consistent with fabrication techniques of existing acoustic ink print heads.

These together with other objects of the invention, along with the various features of novelty which characterize the invention, are pointed out with particularity in the claims annexed to and forming a part of this disclosure. For a better understanding of the invention, its operating advantages and the specific objects obtained by its uses, reference should be made to the accompanying drawings and descriptive matter in which there are illustrated preferred embodiments of the invention.

DESCRIPTION OF THE DRAWING

FIG. 2 is an isometric view of a metal alloy 42 channel plate in accordance with the present invention;

FIG. 3 is an isometric view of a metal alloy 42 aperture plate in accordance with the present invention;

FIGS. 4 through 8, graphically illustrate the fabrication process for the channel plate shown in FIG. 2;

FIGS. 9 through 14, graphically s the fabrication process for the channel plate shown in FIG. 3.

DETAILED DESCRIPTION

Figure 1:
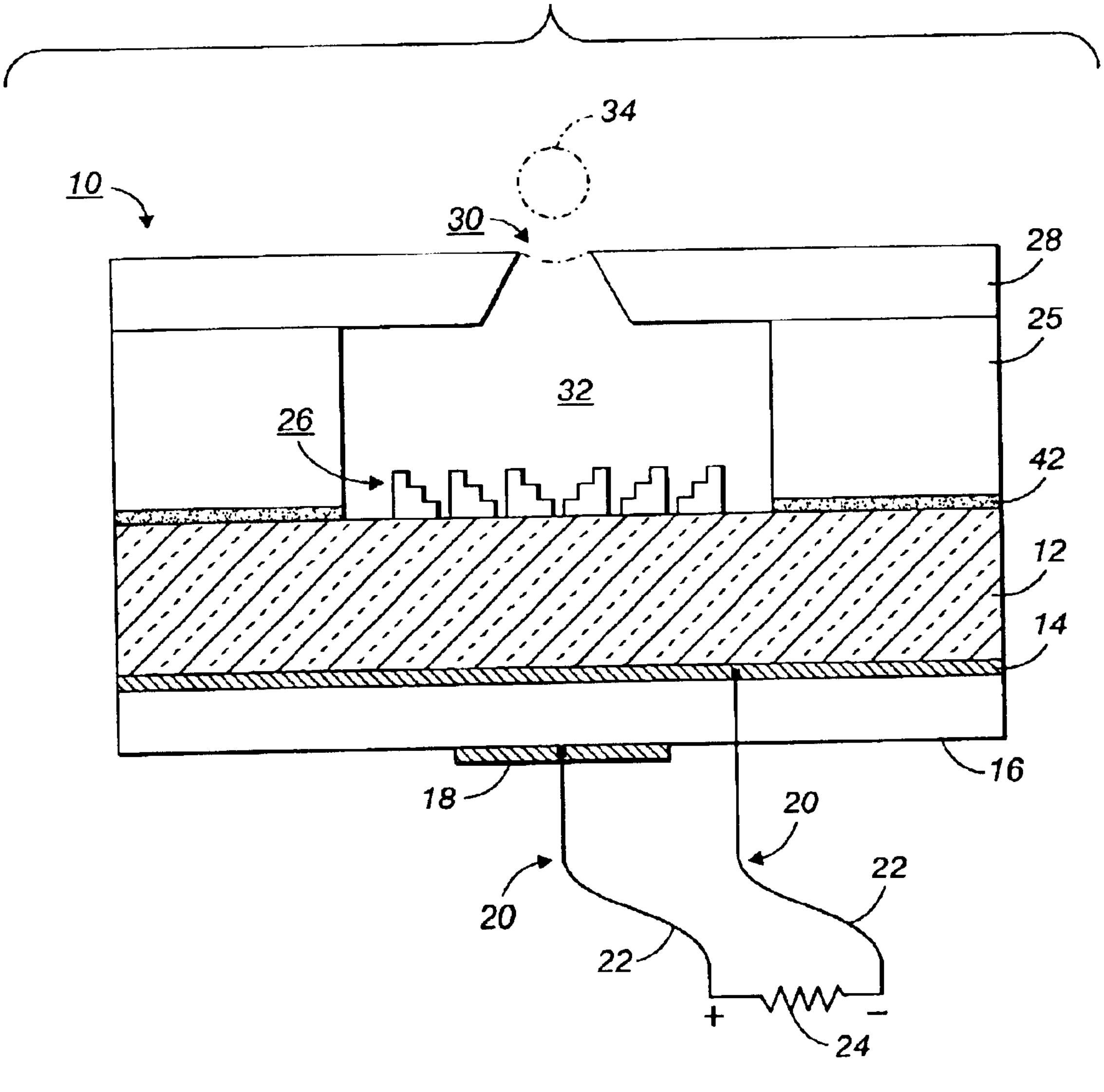
FIG. 1 is a view of a prior art acoustic ink printing element.

Referring now to FIGS. 2 and 3, in accordance with the present invention, metal alloy 42 (alloy with approximately 42% nickel and 58% iron) is used to build the liquid level control/aperture plate consisting of combining a channel plate 50 with an aperture plate 52 defining a plurality of orifices 54 defining an AIP printhead.

Referring now to FIGS. 4 through 8, the fabrication process for the channel plate 50 will be described. The specification for the focal length of the fresnel lens is 356±5 $\mu$m, i.e. the distance between the surface of the glass and the meniscus of the ink is 356±5 $\mu$m. The thickness of the channel plate 50 is required to be 9.8 mils or 249 $\mu$m and the thickness of the aperture plate 52 is required to be 4.3 mils or 110 $\mu$m. Referring to FIG. 4, the starting material 56 for the channel plate is high quality photo-chemical etching grade alloy 42 shim with a thickness 60 of 9±0.1 mils or approximately 229 $\mu$m±2 5 $\mu$m. The image of the channel of the required dimension is patterned 58 on both sides of the alloy 42 by well know photoresist lithographical method. Referring to FIG. 5, after patterning the uncovered area are deposited on both sides of the channel plate with NiP 62 by electroless nickel plating technique to a thickness 64 of about 10 $\mu$m each side.

Next Photoresist is stripped and the areas not covered by NiP (exposed alloy 42) are etched away by chromic acid or other etchants which etch alloy 42 only and do not attack NiP 62 as shown in. FIG. 6. The etching occurs on both sides of the channel plate simultaneously in order to minimize the under cut, as shown by FIG. 7. Lastly, referring to FIG. 8, after etching, the channel plate 56 is overplated with gold 64 by either electroplating, electroless plating or immersion plating methods to a thickness of about 0.5μ. This top layer of gold is used to protect NiP 62 and alloy 42 from being corroded by ink.

Referring now to FIGS. 9 through 14, the fabrication process for the aperture plate 52 will be described. The required thickness of the aperture plate 52 is 4.3 mils or 110μ. The starting material 66 for the aperture plate is a high quality photo-chemical etching grade alloy 42 shim with a thickness of 3.94±0.1 mils or approximately 100 μm±2.5 μm. The images of the top aperture 68 (the aperture facing the paper) and the bottom hole 70 (the hole adjacent to the ink pool) of the required dimensions are patterned on both sides of the alloy 42 by well known photoresist lithographical method. After patterning, the uncovered areas 72 are deposited on both sides of the aperture plate with NiP 72 by electroless nickel plating to a thickness of about 5 μm each side, as shown in FIG. 10. Photoresist is stripped and the areas not covered by NiP (exposed alloy 42) are etched away by chromic acid or other etchants which etch alloy 42 only and do not attach NiP.

Figure 12:
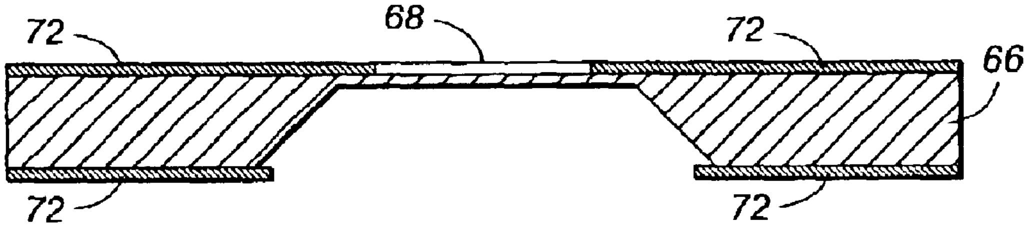
Figure 13:
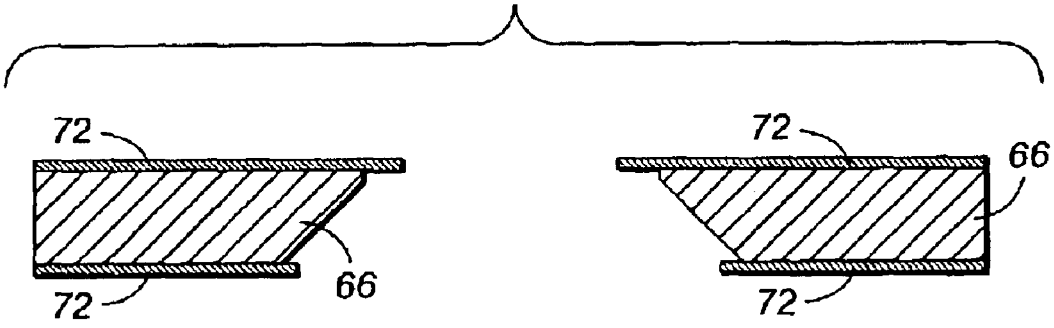
Figure 14:
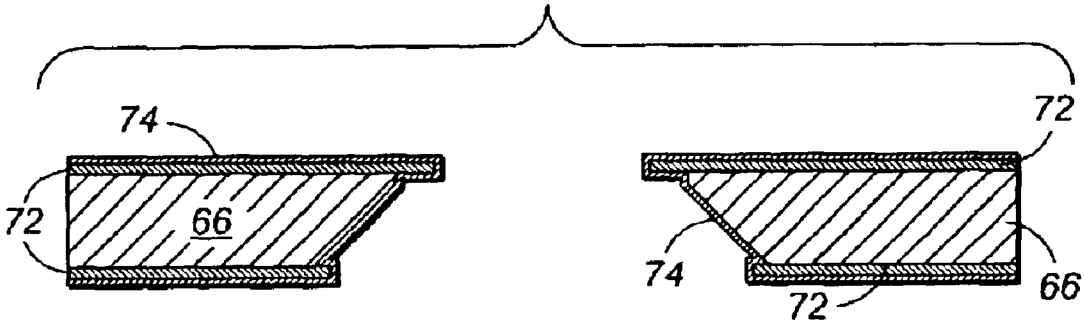

Referring to FIG. 11, in order to form a taper shape of the aperture which is used to maintain the stability of the ink meniscus and facilitate ink ejection, the photoresist on the side requiring larger hole size is first stripped arid the areas (holes) not covered by NiP is etched to the extent that about 90% of the alloy 42 plate has been etched, as shown in FIG. 12. At this stage the photoresist on the other side of the plate is stripped and the top aperture is opened up for etching as shown in FIG. 13. After etching, the aperture plate is overplated with gold 74 by either electroplating, electroless plating or immersion plating to the thickness of about 0.5 μm, as shown in FIG. 14. This top layer 74 of gold is used to protect NiP 72, and alloy 42 from being corroded by ink.

Figure 15:
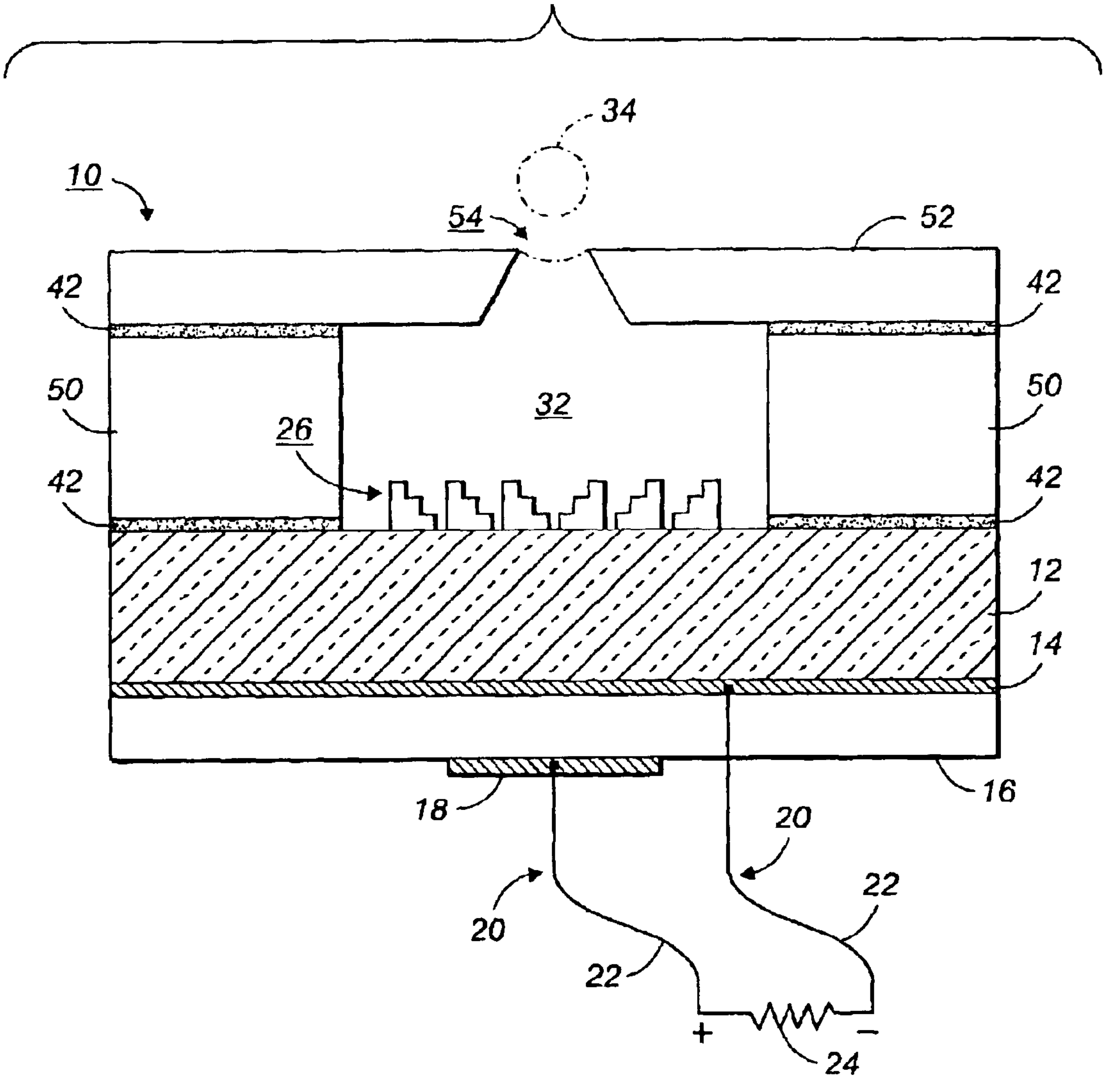
FIG. 15 shows the final AIP print head incorporating the metal alloy 42 in a liquid level control/aperture plate.

FIG. 15 shows the final AIP print head 10 incorporating the metal alloy 42 to build the liquid level control/aperture plate. The liquid level control/aperture now consists of the channel plate and the aperture plate from the metal alloy 42 bonded 42 at two places together thereby defining the liquid level control aperture plate. The structure incorporates all the elements as shown in FIG. 1 wherein the silicon structure has now been replaced by the metal alloy 42 components. The advantages of using metal alloy 42 over silicon is it costs much less than silicon and it will not break during its fabrication, in print head assembly as well as in printhead lifetime. Also, the thermal expansion matches better with glass due to the fact that the thermal expansion coefficient of alloy 42 is 4.45 ppm/C (glass 7059 is 4.6 ppm/C). Also, no warpage is observed after bonding and will be minimal even for full width page printing.

It should further be noted that numerous changes in details of construction and the combination and arrangement of elements may be resorted to without departing from the true spirit and scope of the invention as hereinafter claimed.

What is claimed is:

1. A method for fabricating a plate for use in a liquid level control aperture plate, comprising:

forming a first layer of metal alloy 42;

forming a patterned material on portions of the first layer;

forming a second layer of NiP on portions of the first layer not covered by the patterned material;

removing the patterned material;

etching the portion of the first layer not covered by the second layer to form an opening through the first layer; and forming a third layer of gold over the second layer to form the plate.

2. The method for fabricating the plate according to claim 1, further comprising:

forming the second layer of NiP by an electroless nickel plating technique.

3. The method for fabricating the plate according to claim 2, wherein the etching further comprises:

etching using an etchant which etches the first layer of the alloy 42 but not the second layer of NiP.

4. The method for fabricating the plate according to claim 3, wherein the etching further comprises:

etching both sides of the first layer simultaneously in order to minimize under cut.

5. The method for fabricating the plate according to claim 4, further comprising:

forming the third layer of gold by one of at least electroplating, electroless plating and immersion plating techniques.

6. The method for fabricating the plate according to claim 1, further comprising:

the first layer having a thickness of approximately 9.0 mils.

7. The method for fabricating the plate according to claim 6, further comprising:

forming the plate to be a thickness of approximately 9.8 mils.

8. A method for fabricating a liquid level control aperture plate including a first and second plate, comprising:

forming separately the first and second plates using a process comprising:

providing a first layer of alloy 42;

forming a patterned material on portions of the first layer;

forming a second layer of NiP on portions of the first layer not covered by the patterned material;

removing the patterned material;

etching portions of the first layer not covered by the second layer to form at least one opening through the first layer; and forming a third layer of gold over the second layer to form the plate; and bonding the first and second plates together form the liquid level control aperture plate.

9. The method for fabricating a liquid level control aperture plate according to claim 8, wherein the etching further comprises:

etching a plurality of openings to have a taper so that a first outer part of the opening on one side of the second plate is larger than a second outer part of the opening on the other side of the second plate.

10. The method for fabricating a liquid level control aperture plate according to claim 9, wherein the etching further comprises:

etching the tapered openings on the second plate on one side of the first layer so that 90% of the first layer is removed, and then etching the other side of the first layer to remove a remaining portion of the first layer.

11. The method for fabricating a liquid level control aperture plate according to claim 10, comprising:

forming the first layer of the first plate with thickness of approximately 9.0 mils, and the first layer of the second plate with a thickness of approximately 3.94 mils.

12. The method for fabricating a printhead according to claim 8, comprising bonding the bonded first and second plates to a glass layer.

13. The method for fabricating a printhead according to claim 12, comprising forming a lens inside of the opening of the first plate, the lens in contact with the glass layer.

* * * * *